United States Patent [19]

Lad

[11] Patent Number: 4,621,009

[45] Date of Patent: Nov. 4, 1986

[54] TEAR RESISTANT PLASTIC SHEET FOR USE IN XEROGRAPHIC COPIERS

[75] Inventor: Dalubhai M. Lad, Diamond Bar, Calif.

[73] Assignee: Avery International Corporation, Pasadena, Calif.

[21] Appl. No.: 652,637

[22] Filed: Sep. 21, 1984

[51] Int. Cl.⁴ .................... B32B 5/16; B32B 7/02; B32B 27/08; B32B 27/36

[52] U.S. Cl. ............................. 428/216; 428/220; 428/323; 428/328; 428/331; 428/480; 428/482; 428/483

[58] Field of Search ............... 428/482, 480, 483, 141, 428/212, 215, 216, 220, 323, 328, 331

[56] References Cited

U.S. PATENT DOCUMENTS

| | | | |
|---|---|---|---|
| 4,242,396 | 12/1980 | Wilson et al. | 428/141 |
| 4,352,857 | 10/1982 | Okiyama | 428/141 |
| 4,399,179 | 8/1983 | Minami | 428/212 |
| 4,522,958 | 6/1985 | Das et al. | 428/482 X |

*Primary Examiner*—Thomas J. Herbert
*Attorney, Agent, or Firm*—Christie, Parker & Hale

[57] ABSTRACT

A coating composition for application onto a plastic film to produce a coating onto which xerographic toner will adhere is disclosed. The coating composition produces a coating having a glass transition temperature of from about 50° to about 150° C., a Sheffield surface smoothness of 28 to 50 and, when applied to both sides of the plastic film will generate an opacity of at least 75%. The coating composition comprises a resin binder, preferably a polyester resin, filler particles and solvent, and preferably further comprises a cross-linking agent and an antistatic agent. The coating composition is preferably applied to a polyester film, more preferably to a tear-resistant polyethylene terephthalate film.

15 Claims, No Drawings

TEAR RESISTANT PLASTIC SHEET FOR USE IN XEROGRAPHIC COPIERS

FIELD OF THE INVENTION

This invention relates to a non-tear plastic sheet for use in xerographic copying machines and more particularly to a coating for such a sheet capable of accepting xerographic toner.

BACKGROUND OF THE INVENTION

In xerographic copying, a negative image of a document to be copied is formed on an electrically charged plate with toner, a fine, black, resinous powder. The sheet on which the copy is to be made is advanced over the plate and toner is transferred to the sheet by means of electrostatic forces. The sheet is then advanced to a fixing unit wherein the toner is fixed onto the sheet by radiant heating. The heating is sufficient to melt the resin of the toner so that it will permanently adhere to the sheet. The temperature required to fix conventional toners onto such sheets may be as high as 250° C. or even higher.

The sheets which are used in such copiers must have sufficient thermal stability to withstand the fixing temperatures. The sheets must also have a sufficient coefficient of friction and mechanical strength to enable the sheet to be advanced through the copying machine and further, must have a surface on which the toner will adhere. Paper sheets, of sufficient thickness, are satisfactory for this purpose and have found widespread use in such copying machines. Paper, however, can be easily torn and has little resistance to staining or soiling. Thus, for certain applications, paper is not desired.

Certain plastic films, on the other hand, have superior mechanical strength and are more resistant to staining and soiling than paper and would be preferred for these applications. Such plastic films, however, tend to lack either the thermal stability or coefficient of friction necessary for use in such copiers. Such plastic films also tend to lack the ability to accept and anchor the xerographic toner on their surface.

SUMMARY OF THE INVENTION

This invention provides a coating composition for application onto a plastic film to form a soil and stain resistant coating capable of anchoring or forming a coherent bond with xerographic toner. The coating composition comprises a resin binder, preferably a polyester resin binder, a solvent for the resin binder, and at least one filler and/or pigment. Preferred coating compositions additionally comprise at least one cross-linking agent and at least one antistatic agent.

The coating composition is applied to the plastic film in an amount sufficient to provide a dry coating thickness of from about 0.2 to about 0.6 mils and preferably about 0.4 mils, preferably on both sides of the plastic film. The opacity of the plastic sheet thus formed is at least about 75% and preferably at least about 80%. The dry coating has a glass transition temperature of from about 50° to about 150° C. and a Sheffield surface smoothness of from about 28 to about 50.

In a preferred embodiment of the invention, the coating is applied to a polyester film of polyethylene terephthalate, having a thickness which, when combined with the thickness of the coating, is sufficient to withstand the heat required to fix toner onto the coating without wrinkling or exhibiting other detrimental effects. A film thickness of at least 3.0 mils is presently preferred.

DETAILED DESCRIPTION

In accordance with the present invention, there is provided a coating composition which can be applied to a plastic film and which, when dried, is capable of accepting and forming a cohesive bond with xerographic toner. The coating composition can be any color and comprises a resin binder, a solvent for the resin binder, and at least one filler and/or pigment.

The coating composition is preferably applied to the plastic film in an amount sufficient to provide a dried coating thickness of from about 0.2 to about 0.6 mils and more preferably to a thickness of about 0.4 mils. Application of the coating composition may be by any conventional technique. The coat weight of such coatings is generally about 9 to about 11 grams per square meter of coating. The opacity of the resulting plastic sheet, i.e., coated film, is at least about 75 percent and more preferably at least about 80 percent as measured by a conventional reflection meter.

Coatings from the coating composition have a glass transition temperature of from about 50° to about 150° C. and preferably from about 50° to about 120° C. Coatings having a glass transition temperature less than about 50° C. are not presently preferred because such coatings tend to exhibit blocking, i.e., sheets having such coatings tend to stick together when stacked. Coatings having glass transition temperatures above about 150° C. are also not preferred because such coatings tend to be brittle and result in poor adhesion of the toner to the coating.

The resin binder is present in the coating composition in an amount sufficient to provide from about 30% to about 50% by weight of the binder in a coating made from the coating composition. Amounts greater than about 50% by weight are not preferred because there is a resultant decrease in the amount of filler or pigment and, accordingly, a decrease in the opacity of the plastic sheet. Coatings having resin binder present in amounts less than about 30% by weight are not preferred because such coatings tend to be brittle and exhibit poor adhesion with the plastic film. It is presently preferred that the resin binder comprise a polyester resin. Exemplary of a commercially available polyester resin suitable for use in the coating composition is a polyester resin manufactured by the Goodyear Chemical Co. and sold under the designation PE-200.

It is preferred that the resin binder also comprise a cross-linking agent, preferably in an amount from about 3% to about 15% by weight of the dried coating. It has been found that the inclusion of a cross-linking agent in the coating composition not only improves the integrity and mechanical strength of coatings made from the coating composition, but also improves the adhesion between the toner and the coating and may also enhance the heat stability of the coating.

The inclusion of a cross-linking agent in an amount of less than about 3% by weight of the dry coating is not presently preferred because the benefits imparted by such amounts are marginal at best. Amounts greater than about 15% by weight are also not preferred because no added benefit is seen and because such amounts tend to impart too much brittleness to the coating. The selection of the cross-linking agent generally depends on the type of resin with which it is to cross-link. Exemplary of a suitable cross-linking agent for use with a polyester resin is a methylated melamine formaldehyde resin.

The filler and/or pigment is present in the coating composition in an amount sufficient to give the plastic sheet an opacity of at least 75% and preferably at least about 80%, when coated on both sides. Accordingly, the filler is present in the coating composition in an amount sufficient to provide from about 30% to about 70% by weight filler in the dried coating.

Coatings from the coating compositon have a Sheffield smoothness of from about 28 to about 50 as measured according to ASTM D-792. Accordingly, the filler has a particle size ranging from about 2 micrometers to about 40 micrometers. The specific filler that is used depends on the desired color of the coating composition. For example, fillers such as titanium dioxide and silica are presently preferred if the color of the coating is to be white.

It is preferred that an antistatic agent be added to the composition to reduce the static electrical charges on the surface of the dried coating. The antistatic agent is preferably present in an amount sufficient to provide from about 0.1% to about 5% by weight of the dried coating. Exemplary of a suitable commercially available antistatic agent is a quaternary ammonium chloride derivative of poly-alkorytentiary amine manufactured by Argus Chemical Co. and sold under the designation Markstat AL-12.

The solvent can be any suitable solvent or combination of solvents for the resin binder. The purpose of the solvent in the composition is to dissolve the resin binder and to provide a vehicle for the uniform application of the composition onto the plastic film. Once the coating composition has been applied to the plastic film, the solvent evaporates leaving a solid coherent coating. The type and amount of solvent in the composition is, therefore, that which dissolves the resin binder and which enables such uniform application of the coating composition onto the film by the particular application technique which is used. The solvent or combination of solvents will also be selected to provide a particular drying rate. A solvent combination including methyl ethyl ketone and toluene is presently preferred for use in a coating composition having a polyester resin binder.

The coating composition is preferably applied to a polyester film, and more preferably a polyethylene terephthalate polyester film. Presently preferred polyester films include those sold by American Hoechst under the designations 3000 and 4500 and the DuPont de Nemours Company under the designation DuPont 4 Mill. Type D polyester film. Such polyester films exhibit excellent resistance to tearing.

The thickness of the polyester film is sufficient so that, when combined with the thickness of the coating, the overall thickness is sufficient to be advanced through a xerographic copier without wrinkling or exhibiting other detrimental effects from the heat encountered in the fixing unit of the copier. It has been found that an overall sheet thickness of at least about 4.0 mils, and preferably from about 4.5 to about 5.0 mils, is sufficient for such purposes. Accordingly, it is preferred that the thickness of the polyester film be at least about 3.0 mils and preferably from about 3.5 to about 4.0 mils. Greater thicknesses can be used but are not preferred because the added mechanical strength provided by such sheets is not typically required and because sheets of greater thicknesses require extra storage space which adds to the overall cost of the product.

Coatings provided by this invention will accept and anchor toner as well as ink and pencil lead. Further, such coatings are highly resistant to staining and soiling. When applied to a preferred polyester film, a tear resistant as well as stain and soil resistant sheet for use in xerographic copiers is achieved.

EXAMPLE

A coating composition having the following formula was prepared:

| | |
|---|---|
| PE-200 (100%)[1] | 57 lbs |
| Methyl ethyl ketone | 114 lbs |
| Toluene | 114 lbs |
| R-900[2] | 69 lbs |
| Syloid-244[3] | 11 lbs |
| Cymel 325[4] | 14.86 lbs |
| Markstat AL-12[5] | 3.57 lbs |

[1] Polyester resin sold by Goodyear Chemicals
[2] Titanium dioxide powder sold by DuPont.
[3] Silica powder sold by Davison Chemical Co.
[4] Methylated melamine formaldehyde resin sold by American Cyanamid Co.
[5] Quaternary ammonium chloride derivative of polyalkorytentiary amine antistatic agent sold by Argus Chemical Co.

The coating composition was prepared by adding the PE-200 polyester resin to a clean 55 gallon drum containing the methyl ethyl ketone and toluene with fast mixing until the PE-200 was completely dissolved.

The R-900 titanium dioxide and Syloid-244 silica were then added slowly and mixed for 45 minutes with a high speed Cowel mixer. The resultant mixture was then sand ground at the rate of 10 gallon per hour.

On the day in which the plastic films were coated, the Cymel 325 and Markstat AL-12 were added to the composition and mixed for 30 minutes.

The coating composition was applied to a thickness of 0.4 mil to both sides of polyethylene terephthalate films, specifically those sold by American Hoechst under their designations 3000 and 4500 and by DuPont Co. under their designation DuPont 4 Mill. Type D polyester film. The adhesion of the dried coating to the film was checked by applying adhesive tape (Scotch 610) to the surface of the coating and removng the tape at a 90° angle.

Each of the plastic sheets having a dried coating was processed through a xerographic copier. The coating accepted and exhibited good adhesion with the xerographic toner.

The preceding description has been presented with reference to presently preferred embodiments of the invention. Workers skilled in the art and technology to which this invention pertains will appreciate that alterations and changes in the described compositions and structures can be practiced without meaningfully departing from the principles, spirit and scope of this invention. Accordingly, the foregoing description should not be read as pertaining only to the precise formulas and compositions described, but rather should be read consistent with and as support for the following claims which are to have their fullest fair scope.

What is claimed is:

1. A plastic sheet for use in a xerographic copier having a thickness of at least about 4.0 mils and an opacity of at least about 75% comprising:

a polyester film having a thickness of at least about 3.0 mils; and a coating on at least one side of the polyester film, said coating having a thickness of from about 0.2 to about 0.6 mils, a glass transition temperature of from about 50° C. to about 150° C., and a Sheffield surface smoothness of from about 28 to about 50, said coating comprising:
a resin binder in an amount of from about 30% to about 50% by weight of the coating; and
a filler in an amount of from about 30% to about 70% by weight of the coating.

2. A plastic sheet as claimed in claim 1 wherein the polyester film is a polyethylene terephthalate polyester film.

3. A plastic sheet as claimed in claim 1 wherein the coating further comprises a methylated melamine formaldehyde resin in an amount of from about 3% to about 15% by weight of the coating.

4. A plastic sheet as claimed in claim 1 further comprising an antistatic agent in an amount of from about 0.1% to about 5% by weight of the coating.

5. A plastic sheet as claimed in claim 1 wherein the particle size of the filler is from about 2 to about 40 micrometers.

6. A plastic sheet as claimed in claim 1 wherein the thickness of the plastic sheet is from about 4.5 to about 5.0 mils.

7. A plastic sheet as claimed in claim 1 wherein the plastic sheet has an opacity of at least about 80%.

8. A plastic sheet as claimed in claim 1 wherein the thickness of the coating is about 0.4 mils.

9. A plastic sheet as claimed in claim 1 wherein the filler comprises titanium dioxide.

10. A plastic sheet as claimed in claim 9 wherein the filler further comprises silica.

11. A plastic sheet for use in a xerographic copier having a thickness of at least about 4.0 mils and an opacity of at least about 75% comprising:
a polyethylene terephthalate polyester film having a thickness of at least about 3.0 mils; and
a coating on each side of the polyester film, said coating having a thickness of from about 0.2 to about 0.6 mils, a glass transition temperature of from about 50° C. to about 150° C., and a Sheffield surface smoothness of from about 28 to about 50, said coating comprising:
a resin binder in a amount of from about 30% to about 50% by weight of the coating;
a methylated melamine formaldehyde resin cross-linking agent in an amount of from about 3% to about 15% by weight of the coating; and
a filler having a particle size of from about 2 to about 40 micrometers in an amount of from about 30% to about 70% by weight of the coating.

12. A plastic sheet as claimed in claim 11 further comprising an antistatic agent in an amount of from about 0.1% to about 5% by weight of the coating.

13. A plastic sheet as claimed in claim 11 wherein the thickness of the plastic sheet is from about 4.5 to about 5.0 mils.

14. A plastic sheet as claimed in claim 11 wherein the plastic sheet has an opacity of at least about 80%.

15. A plastic sheet as claimed in claim 11 wherein the thickness of the coating is about 0.4 mils.

* * * * *